3,350,845
METAL ALLOY FOR HYDROGEN SEPARATION AND PURIFICATION
David L. McKinley, Nitro, W. Va., assignor to Union
Carbide Corporation, a corporation of New York
No Drawing. Filed Nov. 18, 1965, Ser. No. 508,548
4 Claims. (Cl. 55—16)

This is a continuation-in-part of application Ser. No. 264,017, filed Mar. 11, 1963, now abandoned.

The present invention relates to the separation and purification of hydrogen gas from multicomponent gas mixtures containing hydrogen and other gases including particularly hydrogen sulfide and other sulfurous constituents in accordance with gaseous diffusion techniques and, more particularly, to a novel hydrogen separation method which comprehends the diffusion of hydrogen through a poison-resistant permeation barrier made from an alloy of palladium and gold.

It has long been known that certain selected component gases comprised in multicomponent gas mixtures can be separated out of the mixtures by directing respective streams of the mixtures against barriers which are permeable to a particular selected component gas but impermeable to other gases and collecting the respective selected component gases at the barrier sides opposite the sides against which the streams are directed. Such processes are performed most effectively at elevated temperatures. It is known that palladium is permeable to hydrogen and impermeable to other gases. Illustrative of the fundamental technique of hydrogen separation through palladium diffusion barriers is the teaching found in United States Patent No. 1,174,631 to Snelling. Thus, by directing a multicomponent gas stream including hydrogen against a thin sheet or film of palladium maintained at an elevated temperature, the hydrogen can be selectively separated and collected in a high purity state at the downstream side of the barrier.

High purity hydrogen in large quantities is required in many industrial chemical production processes and, presently, in national defense work. Procurement of high volume hydrogen supplies of adequate purity at reasonable cost has long been a matter of concern to industry. While not conclusively proven to date, the existing theory respecting the transfer of hydrogen by diffusion through these hydrogen-specific palladium barriers is that the molecular hydrogen, in whatever gas mixture applied to a palladium barrier surface, dissociates into atomic hydrogen upon contacting the palladium and diffuses through interstices of the palladium metal lattice structure. Experimental work indicates that the rate of hydrogen transfer through the permeation barriers take place generally in accordance with the relationship:

$$\text{Rate of } H_2 \text{ Transfer} = \frac{DKPA}{t}$$

where:

$P$ = hydrogen pressure differential across the barrier
$A$ = barrier surface area
$t$ = barrier thickness
$D$ = diffusion coefficient for hydrogen through the barrier
$K$ = solubility constant for hydrogen in the barrier The bearing of temperature on this relationship is taken into account in the respective values for D and K which vary with temperature, and the product DK is conventionally related as the barrier's permeability.

Commercial production of high purity hydrogen by the permeation techniques has long been a goal of the gas processing industries. Such processes, however, have been severely hampered by the high cost of the palladium barriers in relation to their useful life and productivity. While hydrogen of very high purity can be obtained by this known method of selective diffusion through palladium barriers, present conventional supply sources of hydrogen-containing feedstock gases, e.g. coke oven gas, frequently also contain hydrogen sulfide and other sulfurous constituents such as carbon disulfide, carbonyl sulfide, thiophenes and mercaptans which, upon contact with palladium at elevated temperatures, will produce hydrogen sulfide. Hydrogen sulfide even in trace quantities, constitutes what is probably the most potent of poisons of hydrogen dissociation catalysts such as palladium. As a barrier in a working hydrogen diffuser becomes poisoned by hydrogen sulfide impinging on its working face, permeability decreases towards zero rapidly, destroying the barrier's effectiveness in hydrogen separation. The high cost of barrier elements made of palladium or many of the alloys of palladium, when weighed in the light of their vulnerability to hydrogen sulfide poisoning, militates against the commercial practicality of this hydrogen production method. Palladium barrier hydrogen diffusers have thus heretofore been limited generally to the laboratory and other special uses where relatively small quantities of hydrogen are produced and where feed gas sources free of the poisonous sulfurous constituents are available. The use of the method of selective diffusion of hydrogen through hydrogen-permeable palladium barriers on a commercial scale would be highly desirable if this hydrogen sulfide poisoning problem attending the use of palladium barriers could be overcome.

Efforts to overcome other limitations, scil. physical strength limitations, attending the use of palladium diffusion barriers have led researchers in the art to investigate the possibilities of palladium alloys as diffusion barrier materials. It is clear from inspection of the above hydrogen transfer rate relationship that any ideal alloy sub- 99 percent. Permeability of each barrier tested was measured at a temperature of 350° C. and at two pressure levels scil. 75 p.s.i.g. and 300 p.s.i.g. The results of these tests are shown in Table I below.

TABLE I

| Run No. | Barrier Foil Composition (Wt. percent) | | Barrier Foil Thickness, Mils | | Permeability | | | |
|---|---|---|---|---|---|---|---|---|
| | | | | | Hydrogen Transfer Rate at 75 p.s.i.g. Upstream Pressure, 0 p.s.i.g. Downstream Pressure | | Hydrogen Transfer Rate at 300 p.s.i.g. Upstream Pressure, 0 p.s.i.g. Downstream Pressure | |
| | Nominal | Actual | Nominal | Actual | Measured (S.c.f.h.) | (S.c.f.h.)(Mil) (Sq. Ft.) | Measured (S.c.f.h.) | (S.c.f.h.)(Mil) (Sq. Ft.) |
| 7 | 100% Pd | 100% Pd | 1 | 1.12 | 0.142 | 55 | 0.433 | 167 |
| 14 | 10% Ag, 90% Pd | 10.29% Ag, 90.00% Pd | 1 | 1.05 | 0.260 | 94 | 0.811 | 294 |
| 14 Repeat | 10% Ag, 90% Pd | 10.64% Ad, 89.36% Pd | 1 | 1.03 | 0.23+ | 82+ | | |
| 1 | 27%Ag, 73% Pd | 27.18% Ag, 73.05% Pd | 1 | 0.92 | 0.298 | 95 | 0.757 | 240 |
| 13 | 40% Ag, 60% Pd | 40.05% Ag, 59.97% Pd | 1 | 0.93 | 0.113 | 36 | 0.254 | 82 |
| 12 | 52% Ag, 48% Pd | 52.30% Ag, 47.91% Pd | 1 | 1.24 | 0.012 | 5.1 | 0.027 | 11.6 |
| 11 | 80% Ag, 20% Pd | 80.25% Ag, 20.09% Pd | 1 | 1.05 | 0.000 | 0 | 0.000 | 0 |
| 6 | 5% Au, 95% Pd | 4.9% Au, 93.7% Pd | 1 | 1.01 | 0.184 | 64 | 0.514 | 179 |
| 2 | 20% Au, 80% Pd | 20.3% Au, 78.1% Pd | 1 | 1.02 | 0.159 | 56 | 0.462 | 162 |
| 5 | 40% Au, 60% Pd | 39.7% Au, 60.6% Pd | 1 | 0.90 | 0.082 | 25.4 | 0.229 | 71 |
| 4 | 55% Au, 45% Pd | 54.6% Au, 44.8% Pd | 1 | 1.00 | 0.107 | 5.9 | 0.046 | 15.9 |
| 3 | 0.5% B, 99.5% Pd | 0.5% B, 99.5% Pd | 3 | 2.87 | 0.058 | 57 | 0.161 | 159 |
| 8 | 10% Cu, 90% Pd | 9.8% Cu, 90.1% Pd | 1 | 0.97 | 0.093 | 31 | 0.246 | 82 |
| 9 | 40% Cu, 60% Pd | 38.7% Cu, 60.1% Pd | 1 | 1.03 | 0.208 | 74 | 0.506 | 180 |
| 10 | 10% Ni, 90% Pd | 9.8% Ni, 90.6% Pd | 1 | 1.05 | 0.034 | 12.3 | 0.089 | 32 | stitute for pure palladium should, in addition to meeting whatever other requirement sought, be one having a permeability or DK product at least as great and preferably greater than that of pure palladium. A satisfactory alloy substitute, however, may well be one having a lesser DK product than that of pure palladium but which exhibits some other pronounced desirable characteristic over palladium, such as, for example, lower cost, greater strength, greater thermal stability or, as in accordance with the present invention, less vulnerability to poisoning by sulfurous constituents.

With this then being the state of the art, the experimental work which led to the present invention was undertaken with the objective of providing an improved hydrogen diffusion system incorporating a diffusion barrier made of an alloy of palladium which would yield practical permeability, physical strength and resistance to hydrogen sulfide poisoning in continuous use.

In general, my invention comprehends directing a stream of a multicomponent gas mixture containing hydrogen, hydrogen sulfide and perhaps other sulfurous constituents to a proximal side of a gas diffusion barrier consisting essentially of an alloy of palladium and up to about 55 weight percent gold, diffusing the hydrogen of the mixture through the barrier to a distal side thereof, collecting the hydrogen after its diffusion through the barrier while concurrently continuously removing the hydrogen sulfide and components of said mixture other than hydrogen from a zone adjacent the proximal side of the barrier.

The ensuing disclosure describes my invention with greater particularity and sets forth the details of experimental work performed in connection with the invention.

In order to develop general information on the permeability characteristics of alloys of palladium, binary alloys of silver-palladium, gold-palladium, copper-palladium, and nickel-palladium were investigated as diffusion barriers. The alloys tested were in the form of nominally 1 mil thick foils. The actual foil thicknesses which are tabulated were determined both by weight-area measurement and by direct measurement using a mounted dial gauge micrometer device accurate to ±0.01 mils. The foils were supported on porous stainless steel substrates 1/16" thick. The tests were performed in laboratory scale diffusion apparatus, the elements of which are within the ken of persons familiar with the art. The barrier surface area contacted was 0.0029 square feet and the test gas used was cylinder hydrogen having a purity of about In the table, s.c.f.h. means standard cubic feet per hour, referred to atmospheric pressure.

In the series of tests according to Table I above, the diffusion cell temperature was held to within ±½° C. of 350° C. throughout all runs and the upstream pressure was held to within ±0.5 p.s.i.g. A run at any one set of conditions was assumed to be finished when the measured hydrogen diffusion rate remained constant within ±0.001 s.c.f.h. for a period of three to four days. Before and after each test run, leak tests were made with nitrogen to confirm the physical integrity of the barriers.

Of the several different materials tested, certain were selected for investigation of their hydrogen sulfide tolerance. The alloys selected were a 27 weight percent silver-palladium alloy a 40 weight percent copper-palladium alloy and a 40 weight percent gold-palladium alloy. Pure palladium was also included in the investigation. The alloys and palladium tested were in the form of nominally 1 mil thick foils and the experimental techniques and test apparatus used were generally the same as those described above in connection with the experimental work which produced the Table I data. Only one pressure level, 75 p.s.i.g., was employed and the diffusion cell operating temperature was 350° C.

The hydrogen sulfide was introduced into the feed hydrogen by passing cylinder hydrogen through a bed of heated ferrous sulfide pellets. The cylinder hydrogen had previously been passed through conventional trapping devices to remove oxygen and water from the gas. The ferrous sulfide pellets were placed in a suitable container immersed in a molten lead-tin bath which was maintained at a temperature to effect the introduction of the desired parts per million hydrogen sulfide into the hydrogen. Only a portion of the hydrogen sulfide-imbued feed stream, about 20 volumetric percent, was diffused through the diffusion barriers, with the remaining feed gas, about 80 percent, being vented out of the diffusion apparatus at the upstream side of the barrier. By virtue of this flow scheme it was possible to check the hydrogen sulfide content of the feed gas by passing the vented undiffused stream through a series of bubblers containing 0.1 N cadmium chloride solution. The resulting $CdCl_2$, $CdS$ and $HCl$ mixture was titrated at the end of each run to determine the total amount of hydrogen sulfide passed through the cell during the run. With this data and the flow rates known, the actual parts per million concentration of hydrogen sulfide was computed.

The operating conditions and results of this series of tests are set forth below in Table II.

hydrogen sulfide are unsuitable for continuous hydrogen production by this method.

TABLE II

| Run No. | Barrier Foil Composition (Wt. Percent) Nominal | Foil Thickness (mils) Actual | Hydrogen Sulfide Content of the Hydrogen Feed Gas Nominal | Hydrogen Diffusion Rate = $\frac{\text{(S.c.f.h.) (Mil)}}{\text{(Sq. Ft.)}}$ | | | | | | | | | |
|---|---|---|---|---|---|---|---|---|---|---|---|---|---|
| | | | | At the Start of the Run | After 6 Hours | After 1 Day | After 2 Days | After 3 Days | After 4 Days | After 5 Days | After 6 Days | After 7 Days | After 8 Days | After 9 through 15 Days |
| 7 | 100% Pd | 1.12 | None | | | | 55 | | | | | | | |
| 13, H₂S | 100% Pd | 0.92 | {4 p.p.m. / 4.5 p.p.m.¹} | 22 | 20 | 18 | 17 | 17 | 16 | 16 | 16 | | | |
| 14, H₂S | 100% Pd | 0.90 | {4 p.p.m. / 4.7 p.p.m.¹} | 22 | 20 | 17 | 17 | 16 | ² 16 | 51 | 55 | | | |
| 1 | 27% Ag, 73% Pd | 0.92 | None | | | | 95 | | | | | | | |
| 3, H₂S | 27% Ag, 73% Pd | 0.92 | {4 p.p.m. / 3.5 p.p.m.¹} | 23 | 1 | <1 | <1 | <1 | <1 | | | | | |
| 4, H₂S | 27% Ag, 73% Pd | 0.94 | {4 p.p.m. / 3.5 p.p.m.¹} | 21 | 1 | <1 | <1 | <1 | <1 | | | | | |
| 11, H₂S | 27% Ag, 73% Pd | 0.98 | {4 p.p.m. / 4.3 p.p.m.¹} | 8 | 1 | <1 | <1 | <1 | | | | | | |
| 12, H₂S | 27% Ag, 73% Pd | 0.96 | {4 p.p.m. / 4.0 p.p.m.¹} | 15 | 2 | <1 | <1 | | | | | | | |
| 16, H₂S | 27% Ag, 73% Pd | 0.92 | {4 p.p.m. / 4.4 p.p.m.¹} | 16 | 1 | <1 | ²<1 | 19 | 40 | 51 | 64 | | | |
| 9 | 40% Cu, 60% Pd | 1.03 | None | | | | 74 | | | | | | | |
| 18, H₂S | 40% Cu, 60% Pd | 1.03 | {4 p.p.m. / 4.5 p.p.m.¹} | 13 | 8 | 5 | 5 | 4 | 4 | 4 | 4 | 4 | | |
| 17, H₂S | 40% Cu, 60% Pd | 1.03 | {4 p.p.m. / 4.5 p.p.m.¹} | 17 | 8 | 5 | 4 | ² 4 | 67 | 72 | 73 | 73 | 74 | |
| 5 | 40% Au, 60% Pd | 0.90 | None | | | | 25.4 | | | | | | | |
| 10, H₂S | 40% Au, 60% Pd | 0.82 | {4 p.p.m. / 4.3 p.p.m.¹} | 26 | 22 | 21 | 21 | 20 | 21 | 20 | 20 | | | |
| 15, H₂S | 40% Au, 60% Pd | 0.82 | {4 p.p.m. / 4.7 p.p.m.¹} | 26 | 24 | 24 | 23 | ² 23 | 30 | 30 | | | | |
| 19, H₂S | 40% Au, 60% Pd | 0.79 | {20 p.p.m. / 20.6 p.p.m.¹} | 17 | 13 | 12 | 11 | 11 | 11 | 11 | 11 | ² 11 | 28 | 29–31 |
| 20, H₂S | 40% Au, 60% Pd | 0.81 | {6.6% ¹} | <1 | ² 0 | 27 | 29 | 30 | 31 | 31 | 30 | 30 | | |

¹ By Analysis.
² Switched the Feed Gas to Hydrogen Containing No Hydrogen Sulfide.

From the data of Table II it is seen that the permeability of pure palladium foil is immediately reduced to about 40 percent of its normal unpoisoned permeability by 4 parts per million hydrogen sulfide in the feed gas and is ultimately reduced to less than 30 percent of its unpoisoned permeability after diffusing the poison-contaminated gas for 3 or 4 days. The permeability of 27 weight percent silver-palladium alloy foil is immediately reduced to about 25 percent of its normal unpoisoned permeability, and then, within a matter of hours thereafter, to practically zero. The permeability of the 40 weight percent copper-palladium alloy foil is immediately reduced to about 20 percent of its normal unpoisoned permeability and ultimately, after one or two days of diffusion, to about 5 percent of its unpoisoned permeability by the 4 parts per million hydrogen sulfide in the feed gas.

In contrast with the attenuation in permeability suffered by these other materials, the permeability of 40 weight percent gold-palladium alloy foil is only very slowly and slightly decreased by the poison-contaminated feed gas, there being in fact no noticeable immediate loss of permeability and retention of approximately 80 percent of the normal unpoisoned permeability after running on poisoned feed gas for as long as 6 days. In addition, when the poison concentration was raised to 20 parts per million hydrogen sulfide in the feed gas the gold-palladium alloy foil retained more than 40 percent of its unpoisoned permeability after 7 days of continuous operation in the diffuser apparatus. The one higher concentration of hydrogen sulfide, 6.6 percent, in the feed gas resulted in almost immediate complete loss of permeability. While it is not inconceivable that feed gas sources containing more than 20 parts per million hydrogen sulfide may be successfully used in the effective production of hydrogen by the diffusion technique and the consequent additional loss of barrier permeability tolerated, practical considerations bearing on the deleterious effects of the poisonous hydrogen sulfide on the diffusion apparatus generally, indicate that feed gas sources containing as much as 5 or 6 percent As can be seen from the tabulated data of Table II, all of the barrier foils tested, even those most vulnerable to the poisonous effect of the hydrogen sulfide, completely recovered their full permeabilities when the feed was switched to a hydrogen sulfide-free source gas. This phenomenon of course has no practical import since in commercial operations, the very availability of hydrogen sulfide-free feed gas would obviate the problem which my invention solves, and this part of the experimental work was performed only to determine whether the permeability attenuative effects of the hydrogen sulfide poisoning were reversible. It was also noted that after exposure to hydrogen sulfide, the pure palladium and silver-palladium foils were changed in appearance. Pure palladium foil lost its lustre and appeared slightly dull. The silver-palladium foil was even more dull in appearance than the pure palladium foils and appeared slightly etched. The copper-palladium and gold-palladium foils however retained their original appearance and lustre, the gold-palladium foil even after exposure to a 6.6 percent concentration of hydrogen sulfide in Run 20. This, coupled with the permeability recovery phenomenon, indicates that the barrier poisoning is due to adsorption of hydrogen sulfide on the foil surface rather than to chemical attack or sulfide formation on the barrier.

Viewing all of the data cumulatively it can be seen that the addition of up to 20 weight percent gold to palladium effects an increase in hydrogen permeability; that up to 40 weight percent gold can be alloyed with palladium without decreasing its permeability to hydrogen beyond half; and that even an alloy of 55 weight percent gold and palladium retains more than 10 percent of the hydrogen permeability of pure palladium. It is also seen that a diffusion barrier consisting essentially of a relatively high (40) gold weight percent alloy of palladium has an outstandingly superior tolerance for hydrogen sulfide in the feed gas as compared to diffusion barriers of other materials, gold-palladium alloy being in fact the only material thus far found to resist hydrogen sulfide poisoning and prevent the eventual consequent full loss of hydrogen permeability. In addition my investigations have indicated that the attenuative effect of hydrogen sulfide poisoning on gold-palladium alloy hydrogen diffusion barriers is a surface adsorption phenomenon. It is considered that the higher hydrogen sulfide tolerance exhibited by hydrogen diffusion barriers consisting essentially of gold-palladium alloy is due to the greater nobility of gold as compared with other materials investigated. While in the alloys of gold and palladium used in my work the gold was dispersed throughout the palladium, it is considered that such alloy barriers may be otherwise formed. If, for example, a thin palladium foil is coated with a thin layer of gold and then properly heat treated to diffuse the gold into the palladium only near the palladium surface, a superior diffusion barrier can be produced having both high hydrogen sulfide tolerance because of its highly gold working surface and high permeability because of its essentially palladium layer constituting the rest of the barrier. In this manner it is possible to design and construct such alloy barriers to suit specific conditions of permeability and hydrogen sulfide concentrations in feedstocks and to achieve an optimized barrier according to my invention.

From the foregoing disclosure it will be apparent to persons familiar with the art that I have invented an improved method for the separation of hydrogen from gas mixtures containing hydrogen, hydrogen sulfide and perhaps other gases and that my invention provides a significant advance in hydrogen diffusion technique.

The foregoing disclosure and the description of the method the present invention is posed to make for understanding of my concept, experimental work and reduction to practice and should not be construed in any limiting sense, the invention being defined by the scope of the appended claims.

What is claimed is:
1. A method for separating hydrogen from a gas mixture containing hydrogen and sulfurous constituents which method comprises the steps of directing a stream of the gas mixture to a proximal side of a gas diffusion barrier having a foil layer consisting essentially of an alloy of from about 5 to about 55 weight percent gold and the rest palladium, diffusing the hydrogen of the mixture through the foil layer of the barrier to a distal side thereof, and collecting the hydrogen after its diffusion while maintaining at the barrier a pressure differential of at least 75 p.s.i.g. and a temperature at which it is known hydrogen diffusion takes place.

2. The method of claim 1 wherein the pressure differential at the barrier is maintained at from 75 p.s.i.g. to 300 p.s.i.g.

3. The method of claim 2 wherein the temperature maintained at the barrier is about 350° C.

4. The method of claim 1 wherein the temperature maintained at the barrier is about 350° C.

References Cited
UNITED STATES PATENTS

| | | | |
|---|---|---|---|
| 2,773,561 | 12/1956 | Hunter | 55—16 |
| 2,824,620 | 2/1958 | DeRosset | 55—16 |
| 3,022,858 | 2/1962 | Tillyer et al. | 55—158 X |
| 3,148,031 | 2/1964 | Vahldieck et al. | 55—16 X |
| 3,155,467 | 11/1964 | Musashino-Shi et al. | 55—158 X |
| 3,226,915 | 1/1966 | Pinney et al. | 55—158 |
| 3,238,703 | 3/1966 | Straschil et al. | 55—158 |
| 3,241,293 | 3/1966 | Pfefferle | 55—158 X |

FOREIGN PATENTS

| | | |
|---|---|---|
| 109,176 | 9/1917 | Great Britain. |

REUBEN FRIEDMAN, *Primary Examiner.*

J. ADEE, *Assistant Examiner.*